United States Patent
Shinde et al.

(10) Patent No.: US 9,659,348 B1
(45) Date of Patent: May 23, 2017

(54) METHODS AND SYSTEMS FOR HIGH DEFINITION SCALING WITH LOW HARDWARE COMPLEXITY

(71) Applicant: Marvell International Ltd., Hamilton (BM)

(72) Inventors: Sudarshan Shinde, Pune (IN); Tarun Chowdary Kancharla, Bangalore (IN); Panikumar K G, Bangalore (IN); Srinivas Gande, Bangalore (IN)

(73) Assignee: Marvell International Ltd., Hamilton (BM)

(*) Notice: Subject to any disclaimer, the term of this patent is extended or adjusted under 35 U.S.C. 154(b) by 57 days.

(21) Appl. No.: 14/708,671

(22) Filed: May 11, 2015

Related U.S. Application Data (60) Provisional application No. 61/991,935, filed on May 12, 2014.

(51) Int. Cl.
  *G06K 9/46* (2006.01)
  *G06T 3/40* (2006.01)
  *G06T 7/00* (2017.01)

(52) U.S. Cl.
  CPC .......... *G06T 3/4007* (2013.01); *G06K 9/4604* (2013.01); *G06T 7/0085* (2013.01)

(58) Field of Classification Search
  CPC .... G06T 3/4007; G06T 7/0085; G06K 9/4604
  See application file for complete search history.

(56) References Cited

U.S. PATENT DOCUMENTS

| | | | | |
|---|---|---|---|---|
| 8,682,111 B2* | 3/2014 | Huang | ................ | G06T 3/4007 382/298 |
| 2006/0140512 A1* | 6/2006 | Gao | ................ | G06T 3/4007 382/300 |
| 2008/0123998 A1* | 5/2008 | Gomi | ................ | G06K 9/4609 382/300 |
| 2011/0298972 A1* | 12/2011 | Huang | ................ | G06T 3/4007 348/441 |
| 2013/0051702 A1* | 2/2013 | Chien | ................ | G06T 3/403 382/300 |

OTHER PUBLICATIONS

Wikipedia, "Memory Buffer Register," 2016 [online], [retrieved on Aug. 30, 2016]. Retrieved from the internet <URL: https://en.wikipedia.org/wiki/Memory_buffer_register >, 1 page.*

* cited by examiner

*Primary Examiner* — David F Dunphy (57) ABSTRACT

Methods and systems are discussed for high definition scaling. The method may include identifying values for each of a first plurality of points in a first grid. The method may include interpolating values for each of a second plurality of points in a second grid based on a location of a point and the first plurality of points, wherein the second grid is in a first grid. The method may include interpolating a value for the point based on values for each of a subset of the second plurality of points. Interpolating by using the first plurality of points may reduce storage requirements. Directional filters may be used to preserve edge sharpness during interpolation. Iterative interpolation may ensure that a limited number of directional filters are used, thereby further reducing storage requirements.

18 Claims, 6 Drawing Sheets

METHODS AND SYSTEMS FOR HIGH DEFINITION SCALING WITH LOW HARDWARE COMPLEXITY

CROSS REFERENCE TO RELATED APPLICATION

This disclosure claims the benefit under 35 U.S.C. §119 (e) of U.S. Provisional Application No. 61/991,935, filed on May 12, 2014, which is incorporated herein by reference in its entirety.

FIELD OF USE

This disclosure relates to methods and systems for high definition scaling using iterative interpolation in grids to reduce hardware and computational complexity.

BACKGROUND OF THE INVENTION

The background description provided herein is for the purpose of generally presenting the context of the disclosure. Work of the inventors hereof, to the extent the work is described in the background section, as well as aspects of the description that may not otherwise qualify as prior art at the time of filing, are neither expressly or impliedly admitted as prior art against the present disclosure.

Image scaling is an important step in video processing and display. Images may need to be up-scaled or down-scaled by arbitrary factors for several reasons, such as to be displayed on a device with a different resolution than that of the image. Image scaling may also be required in Picture-In-Picture (PIP) applications, where an image may need to be scaled to the size of a PIP window. Image scaling may involve a change in the resolution of an image.

Changing the resolution of an image may distort the image in an undesirable manner by introducing artifacts into the image. An artifact may be an element introduced into the image by the process of scaling that was not part of the original image. For example, scaling an image from a low to a high resolution may introduce blurred edges, jagged edges, or ringing artifacts. These artifacts frequently occur near sharp transitions, or edges, in an image. In another example, scaling an image from a high to a low resolution may result in a loss of details.

Image scaling may need to be performed as a component of video processing for live video display. Image scaling may occur on control circuitry, such as application-specific integrated circuits (ASICs), which pose restrictions on memory usage for image pixels, interpolation filter coefficients, and intermediate data. The control circuitry may also require the computational complexity of the image processing algorithm to be low, or involve only fixed-point integer arithmetic.

Existing scaling methods involve scaling first in the horizontal direction, and then scaling in the vertical direction, or vice-versa. The existing methods therefore may utilize a large number of image scalers on a single chip. Such scaling methods may introduce undesirable artifacts into the scaled images. Adaptive scaling methods may reduce the artifacts introduced by scaling but typically require a large number of line buffers for each image scaler, which prohibits their usage in chips with a large number of image scalers.

SUMMARY

In accordance with an embodiment of the present disclosure, a method is provided for high definition scaling. The method may include identifying values for each of a first set of points in a first grid. The method may include interpolating values for each of a second set of points in a second grid based on a location of a point and the first set of points, wherein the second grid is in the first grid. The method may include interpolating a value for the point based on values for each of a subset of the second set of points. One or more implementations of the present disclosure may provide one or more of the following advantages. In some implementations, the number of points in the first set of points may equal the number of points in the second set of points. In some implementations, the second grid may be a scaled version of the first grid. In some implementations, the first set of points may be stored in line buffers, and the second set of points may subsequently be stored in the same line buffers. In some implementations, interpolating the value for the point may include receiving a sharpness parameter and interpolating the value by weighing values for each of the subset of the second set of points based on the sharpness parameter. In some implementations, interpolating the value for the point may include identifying a direction of an edge in the second grid and choosing the subset of the second set of points based on the direction of the edge. In some implementations, interpolating the value for the point may include interpolating the value based on a subset of the first set of points and the subset of the second set of points. In some implementations, interpolating values for each of the second set of points may include creating a third grid including the first grid and duplicated points of the first grid, and interpolating values for each of the second set of points based on the third grid. In some implementations, interpolating values for each of the second set of points includes minimizing a two-dimensional cost function. In some implementations, identifying values for each of the first set of points may include receiving a third grid and interpolating values for each of the first set of points based on the location of the point and a third set of points in the third grid.

In accordance with an embodiment of the present disclosure, a system is provided for high definition scaling. The system may include control circuitry configured to identify values for each of a first set of points in a first grid, wherein the first grid is stored using storage circuitry. The system may include control circuitry configured to interpolate values for each of a second set of points in a second grid based on a location of a point and the first set of points, wherein the second grid is in the first grid. The system may include control circuitry configured to interpolate a value for the point based on values for each of a subset of the second set of points. One or more implementations of the present disclosure may provide one or more of the following advantages. In some implementations, the number of points in the first set of points may equal the number of points in the second set of points. In some implementations, the second grid may be a scaled version of the first grid. In some implementations, the first set of points may be stored in line buffers, and the second set of points may subsequently be stored in the same line buffers. In some implementations, the control circuitry configured to interpolate the value for the point may be further configured to receive a sharpness parameter and interpolate the value by weighing values for each of the subset of the second set of points based on the sharpness parameter. In some implementations, the control circuitry configured to interpolate the value for the point may be further configured to identify a direction of an edge in the second grid and choose the subset of the second set of points based on the direction of the edge. In some implementations, the control circuitry configured to interpolate the value for the point may be further configured to interpolate the value based on a subset of the first set of points and the subset of the second set of points. In some implementations, the control circuitry configured to interpolate values for each of the second set of points may be further configured to create a third grid including the first grid and duplicated points of the first grid, and interpolate values for each of the second set of points based on the third grid. In some implementations, the control circuitry configured to interpolate values for each of the second set of points may be further configured to minimize a two-dimensional cost function. In some implementations, the control circuitry configured to identify values for each of the first set of points may be further configured to receive a third grid and interpolate values for each of the first set of points based on the location of the point and a third set of points in the third grid.

BRIEF DESCRIPTION OF DRAWINGS

Further features of the disclosure, its nature, and various advantages, will be apparent upon consideration of the following detailed description, taken in conjunction with the accompanying drawings, in which.

DETAILED DESCRIPTION

To provide an overall understanding of the disclosure, certain illustrative embodiments will now be described, including methods and systems for high definition scaling. However, the methods and systems described herein may be adapted and modified as is appropriate for the application being addressed, and the methods and systems described herein may be employed in other suitable applications.

Figure 1:
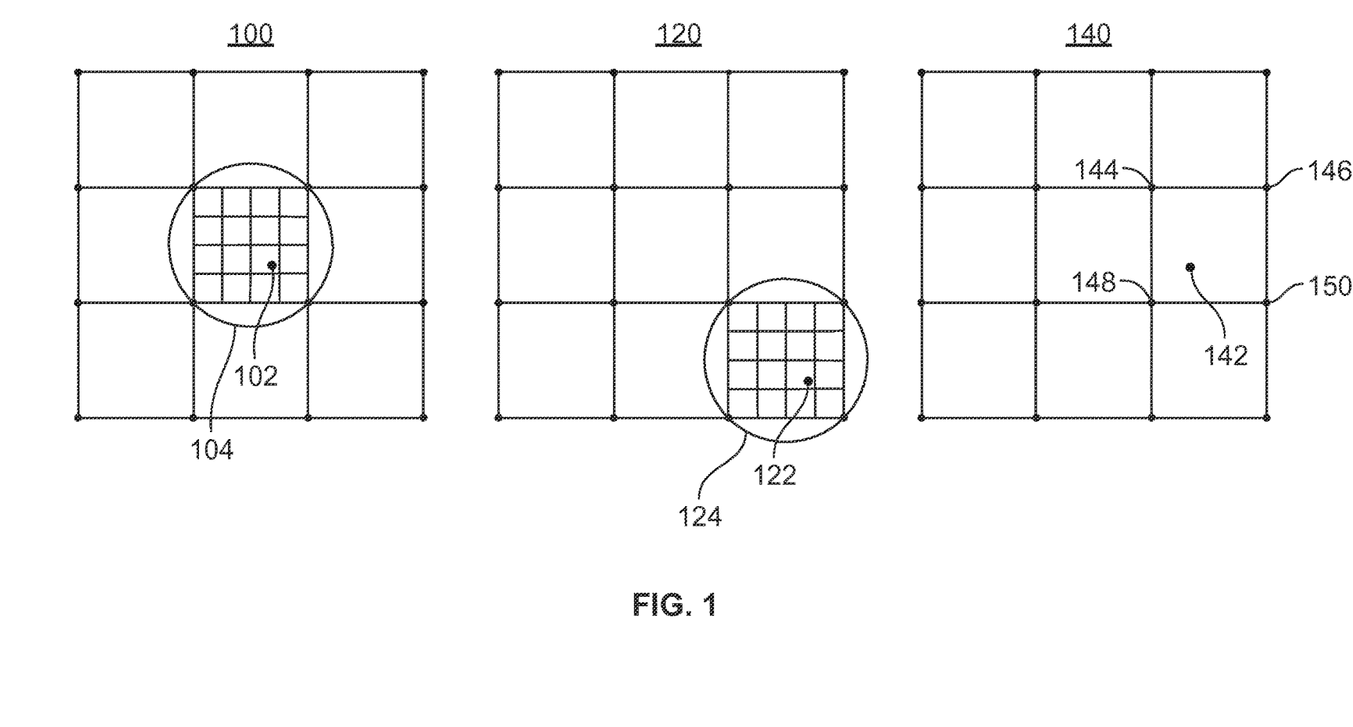
FIG. 1 shows an iterative scaling process, in accordance with some embodiments of the present disclosure.

FIG. 1 shows an iterative scaling process, incorporating elements of the present disclosure. Image scaling may be represented as a two-dimensional interpolation function that transforms an input grid to an output grid of a different resolution. The iterative scaling process shown in FIG. 1 may iteratively obtain interpolated pixels for finer grids. Although the iterative scaling process shown in FIG. 1 describes transforming a low resolution grid to a high resolution grid, it is understood that a similar process could be used to transform a high resolution grid into a low resolution grid. Although the iterative scaling process is described in relation to images and image pixels, it is understood that the iterative scaling process could have applications in various fields.

Each point in grids 100, 120, and 140 may be associated with any number of values. For example, each point in grids 100, 120, and 140 may correspond to an image pixel associated with three values corresponding to each of the red, green, and blue (RGB) values for that pixel. Grid 100 may be the grid containing the original input information that needs to be scaled to a different resolution. The iterative scaling process may need to interpolate a value associated with point 102 to scale grid 100. For example, the iterative scaling process may need to interpolate RGB values for the pixel corresponding to point 102 to transform grid 100 from a low resolution grid to a high resolution grid.

Although grids 100, 120, and 140 are represented as having four rows and four columns, it is understood that the iterative scaling process could involve grids of any dimension. Input grid 100 may be stored in four line buffers. Input grid 100 may be stored in the four line buffers such that each row is in a single buffer, each column is in a single buffer, or any other suitable configuration. In some embodiments, only two line buffers may be needed to transform an image from a high resolution image to a low resolution image by down-scaling a grid. In some embodiments, more line buffers may be used to provide better scaling, which may lead to better image quality after scaling. The iterative scaling process may first determine a location of point 102 in input grid 100. The iterative scaling process may scale the section 104 of input grid 100 where point 102 is located. Scaling section 104 may mean creating intermediate grid 120 corresponding to section 104 in input grid 100.

Intermediate grid 120 may be created by interpolating values for points in intermediate grid 120 from points in input grid 100. The interpolation may be performed using pre-computed interpolation filters. The interpolation filters may be computed by using kernel regression, which is a data-dependent generic interpolation method.

The interpolation filters may be computed as follows. Input grid 100 and intermediate grid 120 may each be represented by a respective two-dimensional function F(x, y). Each grid point in input grid 100 may be given a value from 0 to 15, with each point having a unique value. Hence, the value associated with each point in input grid 100 may be found by calculating $F_i = F(x_i, y_i)$, where i is a value from 0 to 15 that identifies the respective point. Each value $F_i$ may be assigned a weight $W_i$ that describes its importance in the interpolation. The interpolation equation for point (x, y) in intermediate grid 120 located in section 104 of input grid 100 may use points $(x_i, y_i)$ from input grid 100 as follows:

$$\tilde{F}_i = \sum_{k=0}^{N} \beta_k^T V_k(\Delta x_i, \Delta y_i), i \in (0, 1, \ldots, 15)$$

Where, $$\Delta x_i = (x_i - x)$$

$$\Delta y_i = (y_i - y)$$

$V_k$ is a vector with length k, with $m^{th}$ element calculated as follows:

$$V_k[m] = \Delta x_i^m \Delta y_i^{k-m}$$

$\beta_k$ is a vector with $m^{th}$ element calculated as follows:

$$\beta_k[m] = C_m^k \frac{\partial F^k}{\partial x^m \partial y^{k-m}}\bigg|_{(x,y)}$$

It can be seen that $\beta_0 = F$, which gives the interpolated pixel values for intermediate grid 120. The interpolation filter can be obtained by minimizing the cost function:

$$J(\beta_0, \beta_1, \beta_2, \ldots) = \sum_{i=0}^{P-1} (F_i - \tilde{F}_i(\beta_0, \beta_1, \beta_2, \ldots))^2 W_i$$

Hence, the interpolation filter can be represented as:

$$H_{kr} = e_0^T (S^T W S)^{-1} S^T W$$

where:

$$e_0^T = [1, 0, 0, 0, \ldots]$$

and:

$$S = \begin{bmatrix} 1 & V_1^T(\Delta x_0, \Delta y_0) & V_2^T(\Delta x_0, \Delta y_0) & \ldots \\ 1 & V_1^T(\Delta x_1, \Delta y_1) & V_2^T(\Delta x_1, \Delta y_1) & \ldots \\ \vdots & \vdots & \vdots & \ddots \end{bmatrix}$$

and:

$$W = \text{diag}\{W_0, W_1, \ldots\}$$

The values for points in intermediate grid 120 may be calculated using the following equation:

$$F(x,y) = H_{kr}^T d$$

where d is a vector of values of all points in input grid 100:

$$d = [F_0, F_1, F_2, \ldots]$$

After values for points in intermediate grid 120 have been interpolated from input grid 100, the location of point 102 may be determined in intermediate grid 120. Point 102 in input grid 100 may correspond to point 122 in intermediate grid 120. Point 122 may be located in section 124 of intermediate grid 120. Hence, the iterative scaling process may scale intermediate grid 120 to create final grid 140 by scaling section 124 of intermediate grid 120. Points in final grid 140 may be computed using interpolation from points in intermediate grid 120, similar to how points in intermediate grid 120 were computed using interpolation from points in input grid 100.

Although only two levels of grid scaling have been shown in FIG. 1, it is understood that iterative scaling may be applied any number of times to create any number of interpolated grids. This may allow for scaling of input grid 100 by any arbitrary scaling factor. The iterative scaling process may store input grid 100 in four line buffers during a first clock cycle, store intermediate grid 120 in the same four line buffers during a second clock cycle, and store final grid 140 in the same four line buffers during a third clock cycle. In this way, memory requirements to store the grids may be minimized, as all grids may be stored in the same line buffers.

Point 122 from intermediate grid 120 may correspond to point 142 in final grid 140. The iterative scaling process may determine the location of point 142 in final grid 140. Then, the iterative scaling process may interpolate a value for point 142 by weighing and combining the values for the four surrounding points 144, 146, 148, and 150. In some embodiments, the four surrounding points 144, 146, 148, and 150 may be given equal weights to create a direction agnostic interpolation value for point 142. In some embodiments, the weight given to each of the four surrounding points 144, 146, 148, and 150 may be determined by a weighting factor to account for the effects of any edge that may exist near point 142.

Figure 2:
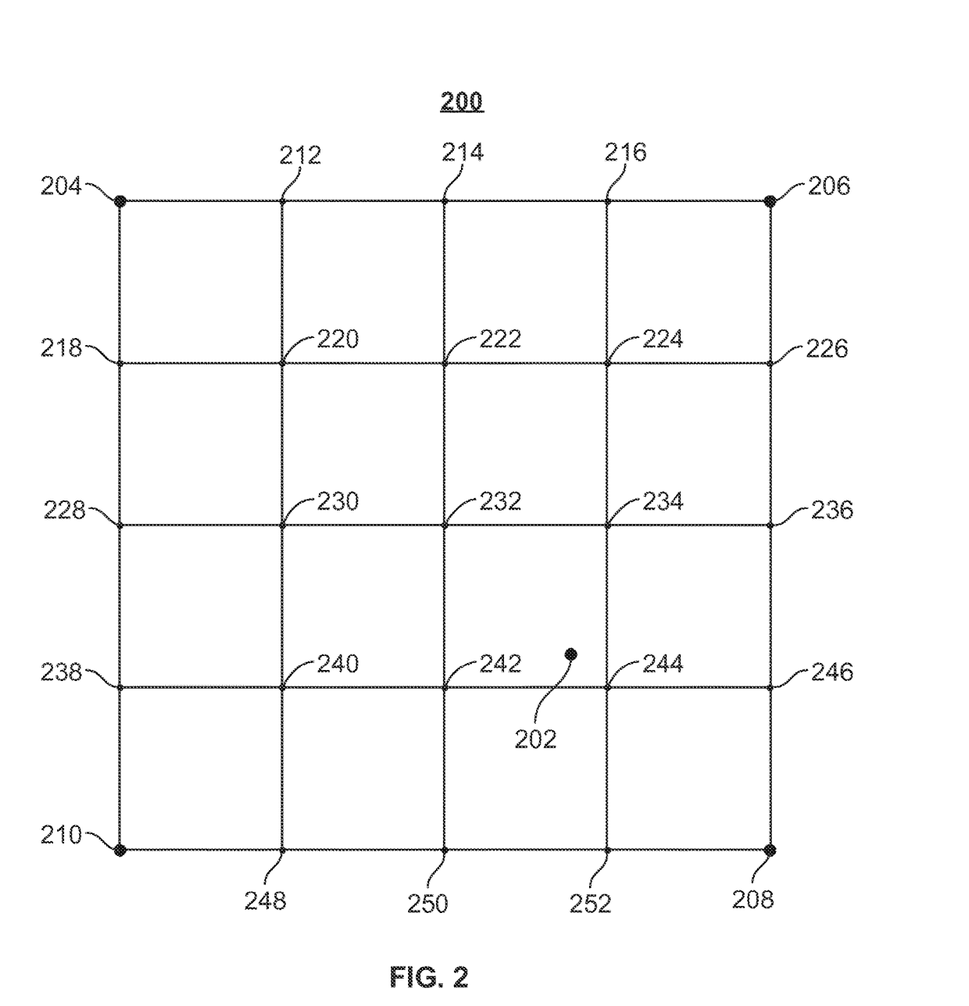
FIG. 2 shows a detailed view of an interpolated grid, in accordance with some embodiments of the present disclosure.

FIG. 2 shows a detailed view of an interpolated grid incorporating some embodiments of the present disclosure. Grid 200 may correspond to the interpolated grid created in section 104 of input grid 100. Point 202 may correspond to point 102 in input grid 100.

Points 204, 206, 208, and 210 may be points from original input grid 100. Points 212, 214, 216, 218, 220, 222, 224, 226, 228, 230, 232, 234, 236, 238, 240, 242, 244, 246, 248, 250, and 252 may be interpolated points, which have been interpolated using input grid 100. Grid 200 has five rows and five columns. However, input grid 100 and intermediate grid 120 both have four rows and four columns. To create intermediate grid 120 from grid 200, the rightmost column and the bottom row may be removed. That is, points 206, 226, 236, 246, 210, 248, 250, 252, and 208 may be removed. The remaining points may then be stored in the same line buffers that input grid 100 was stored in, to create intermediate grid 120. In some embodiments grid 200 may be stored in a predetermined memory location capable of storing a grid with five rows and five columns.

In some embodiments, other rows or columns may be removed from grid 200, as long as point 202 is not removed from grid 200. For example, the leftmost column and top row may be removed from grid 200. That is the points 204, 212, 214, 216, 206, 218, 228, 238, and 210 may be removed from grid 200 to create intermediate grid 120.

Figure 3:
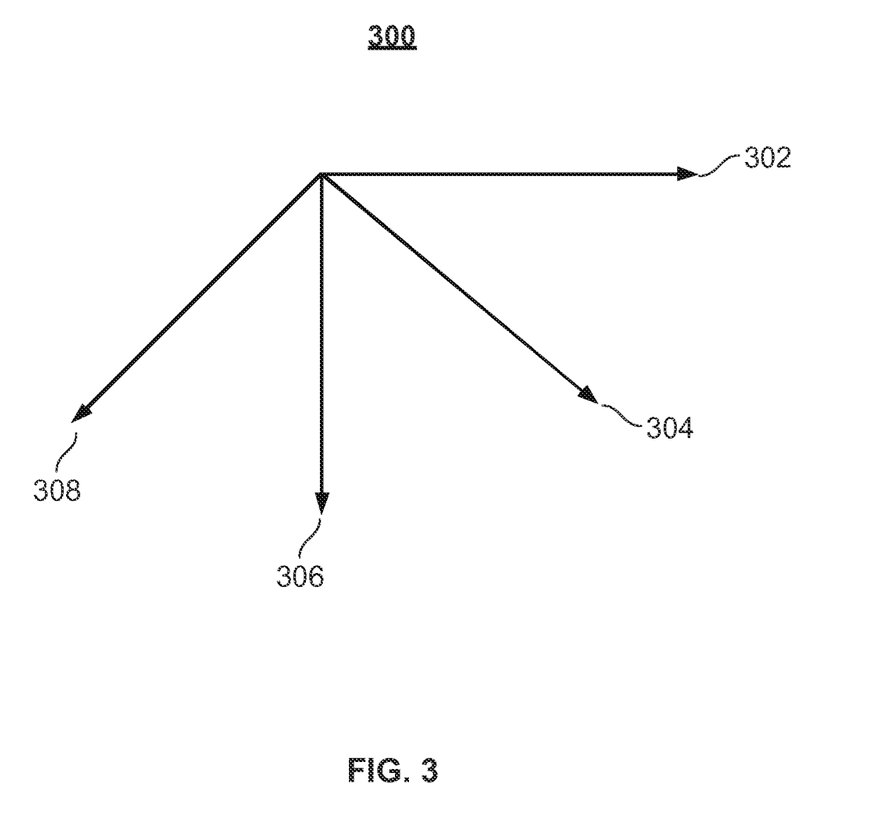
FIG. 3 shows four directions for which directional interpolation filters are pre-computed, in accordance with some embodiments of the present disclosure.

FIG. 3 shows four directions for which directional interpolation filters are pre-computed incorporating some embodiments of the present disclosure. Although only four directions are shown in FIG. 3, any number of directions may be used in combination with the methods and systems described in this disclosure. Increasing the number of directions in which directional interpolation filters are pre-computed may increase the computational complexity and storage requirements associated with the iterative scaling process.

Combining input grid 100, or any other grid composed of four rows and four columns as shown in FIG. 1, and four directions 300 allows for 64 filters to be pre-computed. That is, one filter is computed for each direction for each point in a 4×4 grid. In some embodiments, each of the 64 interpolation filters may comprise 16 taps. In some embodiments, each of the 64 interpolation filters may comprise 8 taps, making use of the symmetry in filter coefficients to halve the number of taps from 16. Pre-computing and storing the filters reduces the computational complexity and storage requirements of the scaling process.

The iterative scaling process determines if edges exist close to point 102 in any of directions 302, 304, 306, and 308. If edges exist, then those edges may be taken into account during the scaling process to avoid artifacts such as blurred edges, jagged edges, or ringing artifacts.

Figure 4:
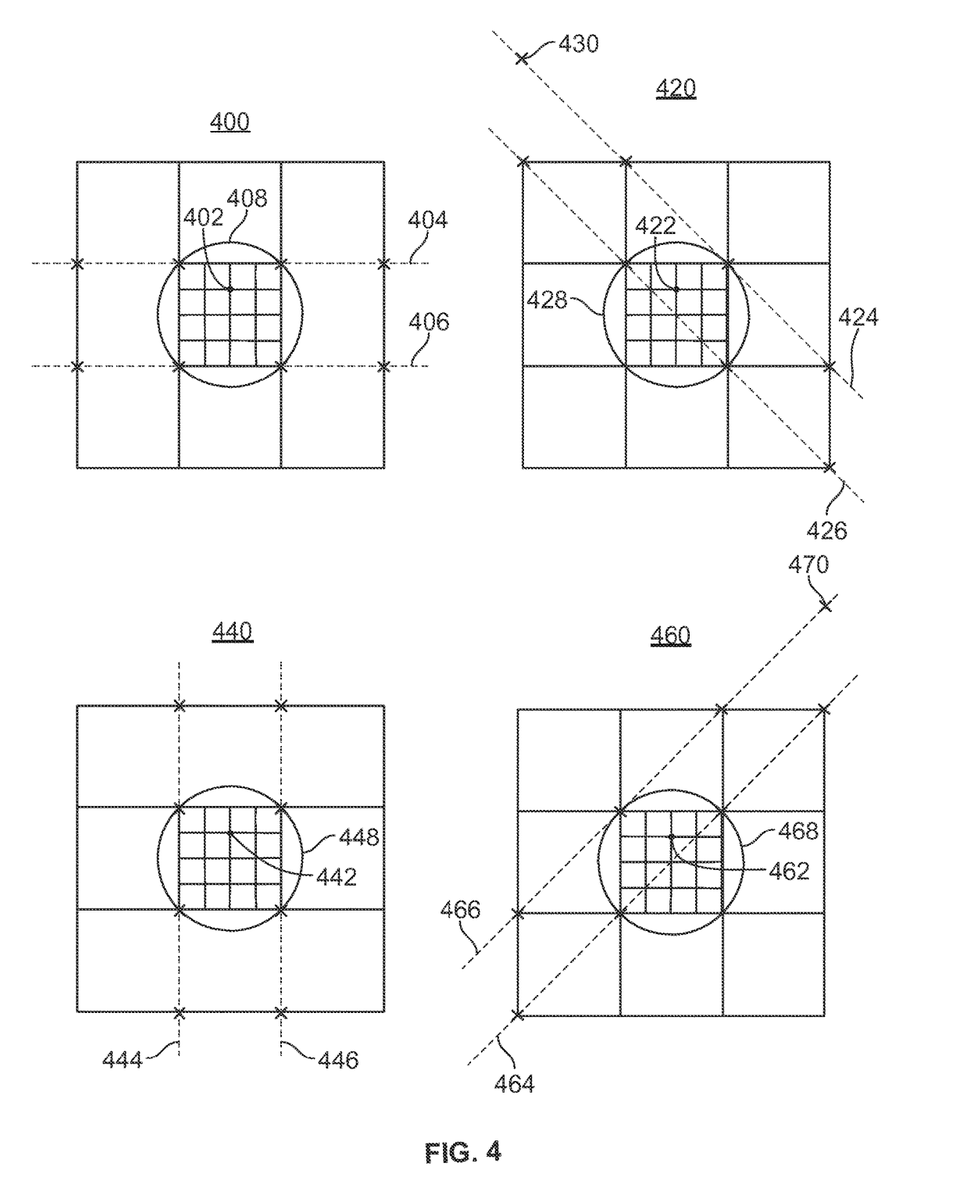
FIG. 4 shows weight masks for taking into account effects of edges in four directions, in accordance with some embodiments of the present disclosure.

FIG. 4 shows weight masks for taking into account effects of edges in four directions incorporating some embodiments of the present disclosure. Each of directions 302, 304, 306, and 308 may be a direction in which edge detection is performed. Any suitable edge detection algorithm may be used to detect edges. If an edge is detected in any of the directions, a corresponding weight mask may be used to interpolate points for the grid. Direction 302 may correspond to mask 400, direction 304 may correspond to mask 420, direction 306 may correspond to mask 440, and direction 308 may correspond to mask 460. Edge detection may be performed during the interpolation of intermediate grid 120 for input grid 100, or during the interpolation of final grid 140 for intermediate grid 120, as described in relation to FIG. 1. Each point in any of masks 400, 420, 440, or 460 may correspond to a point in input grid 100 or intermediate grid 120.

Mask 400 may be used on input grid 100 if an edge is detected in direction 302. Point 402 is in section 408 of mask 400, so the grid in section 408 may be interpolated. A sharpness parameter, α, may be used in mask 400. α may be a pre-set parameter, or it may be tuned using software. α may be a value between 0 and 1, inclusive. α may be tuned to a lower value to provide a sharper image, or to a higher value to provide a less sharp image, till a desired image is produced. Grid lines 404 and 406 may be selected so they are closest on mask 400 to point 402. To account for the edge in direction 302, points along grid lines 404 and 406 in input grid 100 may be given unit weights during interpolation (i.e., a weight of 1), while points not along grid lines 404 and 406 in input grid 100 may be weighted by a factor of α. Hence, an α value of 0 will create a mask that performs an interpolation using only points along a detected edge, while an α value of 1 will create a direction agnostic mask that weighs all points in input grid 100 equally. This weighting may be taken into account in matrix W used during interpolation calculations, as described in relation to FIG. 1 above.

Similarly, mask 420 may be used on input grid 100 if an edge is detected in direction 304. Point 422 is in section 428 of mask 420, so the grid in section 428 may be interpolated. To account for the edge in direction 304, points along grid lines 424 and 426 in input grid 100 may be given unit weights during interpolation, while points not along grid lines 424 and 426 in input grid 100 may be weighted by a factor of α. Note that since each of grid lines 424 and 426 needs four points along it, point 430 is needed for interpolating values in direction 304. Point 430 is not part of 4×4 mask 420 corresponding to input grid 100. The value of point 430 may be obtained as described in relation to FIG. 5.

Mask 440 may be used on input grid 100 if an edge is detected in direction 306. Point 442 is in section 448 of mask 440, so the grid in section 448 may be interpolated. To account for the edge in direction 306, points along grid lines 444 and 446 in input grid 100 may be given unit weights during interpolation, while points not along grid lines 444 and 446 in input grid 100 may be weighted by a factor of α.

Lastly, mask 460 may be used on input grid 100 if an edge is detected in direction 308. Point 462 is in section 468 of mask 460, so the grid in section 468 may be interpolated. To account for the edge in direction 308, points along grid lines 464 and 466 in input grid 100 may be given unit weights during interpolation, while points not along grid lines 464 and 466 in input grid 100 may be weighted by a factor of α. Note that point 470 is not part of 4×4 mask 460 corresponding to input grid 100. The value of point 470 may be obtained as described in relation to FIG. 5.

Figure 5:
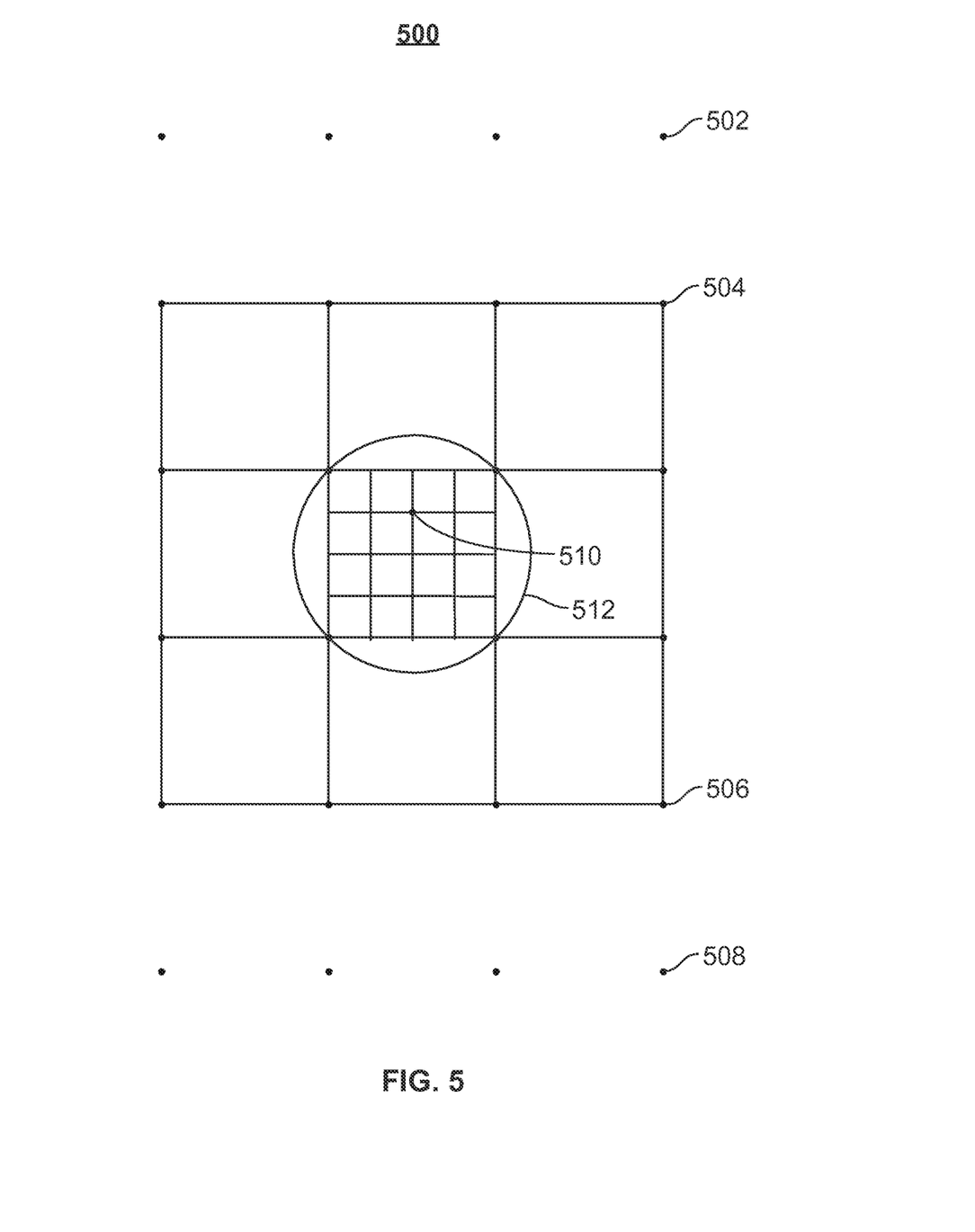
FIG. 5 shows a detailed view of a grid that may be used in weight masks, in accordance with some embodiments of the present disclosure.

FIG. 5 shows a detailed view of a grid that may be used in weight masks incorporating some embodiments of the present disclosure. Weight mask grid 500 may be used for computing any of masks 400, 420, 440, and 460 described in relation to FIG. 4. Rows of weight mask grid 500 between row 504 and row 506 may correspond to data from input grid 100, from intermediate grid 120, or from final grid 140.

Row 504 of weight mask grid 500 may be duplicated to create row 502. Row 506 may be duplicated to create row 508. This may allow mask 420 to interpolate using point 430. Similarly, this may allow mask 460 to interpolate using point 470. Duplicating row 504 to create row 502 may reduce storage requirements and allow the grids from FIG. 1 to be stored in four line buffers.

Figure 6:
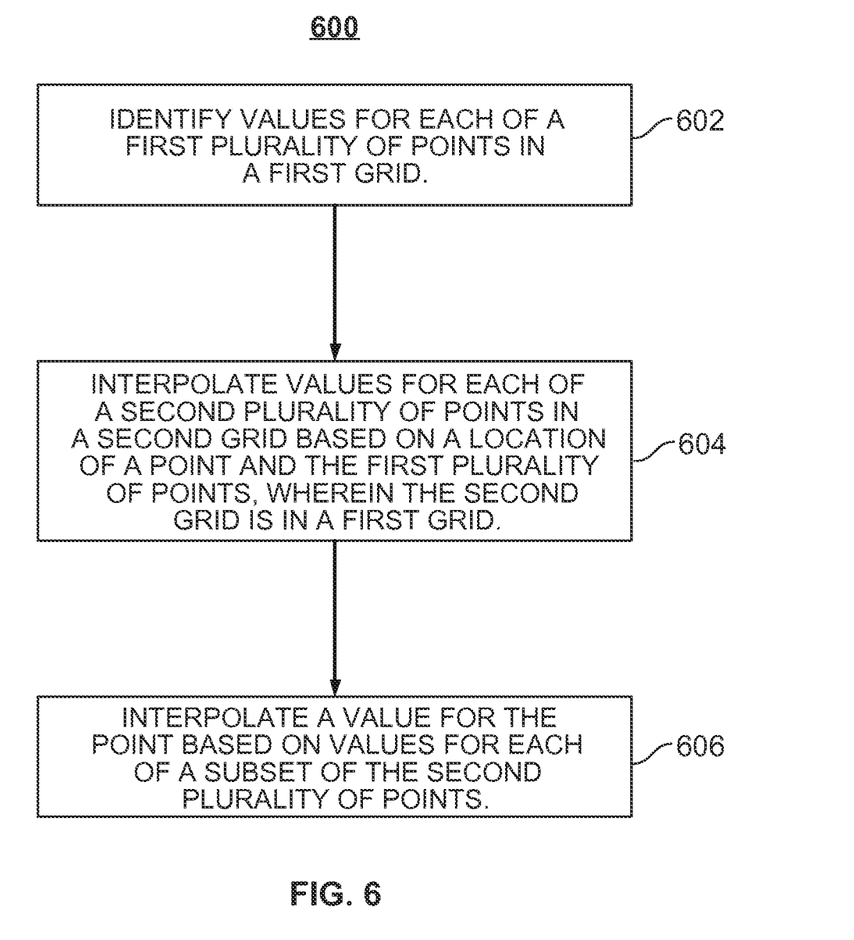
FIG. 6 shows a flow diagram of a process for high definition scaling, in accordance with some embodiments of the present disclosure.

FIG. 6 shows a flow diagram of a process 600 for high definition scaling incorporating some embodiments of the present disclosure. Process 600 may begin at block 602 by identifying values for each of a first plurality of points in a first grid. For example, values corresponding to each point in intermediate grid 120 may be identified. These values may be values describing each pixel in intermediate grid 120, such as RGB values.

Process 600 may proceed to block 604 by interpolating values for each of a second plurality of points in a second grid based on a location of a point and the first plurality of points, wherein the second grid is in a first grid. For example, point 122 may be identified to be located in section 124. Based on the location of point 122 in section 124, values for final grid 140 may be interpolated from intermediate grid 120. The interpolation may use sharpness parameter a to account for edges and reduce artifacts in the scaled grid.

Process 600 may proceed to block 606 by interpolating a value for the point based on values for each of a subset of the second plurality of points. For example, a value for point 142 may be interpolated based on a subset of points in final grid 140. Points 144, 146, 148, and 150 surrounding point 142 may be averaged to interpolate a value for point 142. In some embodiments, points 144, 146, 148, and 150 may be weighted differently to account for effects of edges that may exist in final grid 140.

The methods and systems discussed in this application may be implemented at least partially on transitory or non-transitory computer-readable media having transitory or non-transitory computer-readable instructions stored thereon.

While various embodiments of the present disclosure have been shown and described herein, it will be obvious to those skilled in the art that such embodiments are described by way of example only. Numerous variations, changes, and substitutions will now occur to those skilled in the art without departing from this disclosure. It should be understood that various alternatives to the embodiments of the disclosure described herein may be employed in practicing the disclosure. It is intended that the following claims define the scope of the disclosure and that methods and systems within the scope of these claims and their equivalents be covered thereby.

What is claimed is:

1. A method for performing high definition image scaling with low hardware complexity, the method comprising:
   identifying values for each of a first plurality of points in a first grid;
   storing the first plurality of points in the first grid in a set of line buffers;
   interpolating values for each of a second plurality of points in a second grid based on a location of a point and the first plurality of points, wherein the second grid is in the first grid;
   overwriting the first plurality of points stored in the set of line buffers with the second plurality of points in the second grid; and
   interpolating a value for the point based on values for each of a subset of the second plurality of points.

2. The method of claim 1, wherein a first number of the first plurality of points equals a second number of the second plurality of points.

3. The method of claim 1, wherein the second grid is a scaled version of the first grid.

4. The method of claim 1, wherein interpolating the value for the point further comprises:
receiving a sharpness parameter; and
interpolating the value by weighing the values for each of the subset of the second plurality of points based on the sharpness parameter.

5. The method of claim 1, wherein interpolating the value for the point further comprises:
identifying a direction of an edge in the second grid; and
choosing the subset of the second plurality of points based on the direction of the edge.

6. The method of claim 1, where the subset of the second plurality of points is a first subset, and wherein interpolating the value for the point further comprises:
interpolating the value based on a second subset of the first plurality of points in the first grid.

7. The method of claim 1, wherein interpolating values for each of the second plurality of points further comprises:
creating a third grid comprising the first grid and duplicated points of the first plurality of points in the first grid; and
interpolating values for each of the second plurality of points based on the third grid.

8. The method of claim 1, wherein interpolating values for each of the second plurality of points further comprises minimizing a two-dimensional cost function.

9. The method of claim 1, wherein identifying values for each of the first plurality of points further comprises:
receiving a third grid; and
interpolating values for each of the first plurality of points based on the location of the point and a third plurality of points in the third grid.

10. A system for performing high definition image scaling with low hardware complexity, the system comprising:
a processor configured to:
identify values for each of a first plurality of points in a first grid;
store the first plurality of points in the first grid in a set of line buffers;
interpolate values for each of a second plurality of points in a second grid based on a location of a point and the first plurality of points, wherein the second grid is in the first grid;
overwrite the first plurality of points stored in the set of line buffers with the second plurality of points in the second grid; and
interpolate a value for the point based on values for each of a subset of the second plurality of points.

11. The system of claim 10, wherein a first number of the first plurality of points equals a second number of the second plurality of points.

12. The system of claim 10, wherein the second grid is a scaled version of the first grid.

13. The system of claim 10, wherein the processor configured to interpolate the value for the point is further configured to:
receive a sharpness parameter; and
interpolate the value by weighing the values for each of the subset of the second plurality of points based on the sharpness parameter.

14. The system of claim 10, wherein the processor configured to interpolate the value for the point is further configured to:
identify a direction of an edge in the second grid; and
choose the subset of the second plurality of points based on the direction of the edge.

15. The system of claim 10, where the subset of the second plurality of points is a first subset, and wherein the processor configured to interpolate the value for the point is further configured to:
interpolate the value based on a second subset of the first plurality of points in the first grid.

16. The system of claim 10, wherein the processor configured to interpolate values for each of the second plurality of points is further configured to:
create a third grid comprising the first grid and duplicated points of the first plurality of points in the first grid; and
interpolate values for each of the second plurality of points based on the third grid.

17. The system of claim 10, wherein the processor configured to interpolate values for each of the second plurality of points is further configured to minimize a two-dimensional cost function.

18. The system of claim 10, wherein the processor configured to identify values for each of the first plurality of points is further configured to:
receive a third grid; and
interpolate values for each of the first plurality of points based on the location of the point and a third plurality of points in the third grid.

* * * * *